(12) United States Patent
Woodruff et al.

(10) Patent No.: US 7,421,166 B1
(45) Date of Patent: Sep. 2, 2008

(54) LASER SPARK DISTRIBUTION AND IGNITION SYSTEM

(75) Inventors: Steven Woodruff, Morgantown, WV (US); Dustin L. McIntyre, Morgantown, WV (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 74 days.

(21) Appl. No.: 11/462,516

(22) Filed: Aug. 4, 2006

(51) Int. Cl.
G02B 6/26 (2006.01)
G02B 6/42 (2006.01)
F02P 7/063 (2006.01)
H01S 3/091 (2006.01)

(52) U.S. Cl. ............... 385/39; 385/15; 385/31; 385/147; 123/143 R; 123/146.5 R; 372/9; 372/10; 372/69; 372/70; 372/77

(58) Field of Classification Search ......... 385/39; 123/146.5 R; 372/10, 77
See application file for complete search history.

(56) References Cited

U.S. PATENT DOCUMENTS

| | | | | |
|---|---|---|---|---|
| 5,756,924 A * | 5/1998 | Early | ............ | 102/201 |
| 5,983,871 A * | 11/1999 | Gordon et al. | ............ | 123/536 |
| 6,382,957 B1 * | 5/2002 | Early et al. | ............ | 431/1 |
| 6,394,788 B1 * | 5/2002 | Early et al. | ............ | 431/1 |
| 6,413,077 B1 * | 7/2002 | Early et al. | ............ | 431/1 |
| 6,428,307 B1 * | 8/2002 | Early et al. | ............ | 431/1 |
| 6,514,069 B1 * | 2/2003 | Early et al. | ............ | 431/1 |
| 6,676,402 B1 * | 1/2004 | Early et al. | ............ | 431/1 |
| 7,114,858 B2 * | 10/2006 | Gupta et al. | ............ | 385/88 |
| 2006/0032471 A1 * | 2/2006 | Yalin et al. | ............ | 123/143 B |
| 2006/0037572 A1 * | 2/2006 | Yalin et al. | ............ | 123/143 B |
| 2006/0055925 A1 * | 3/2006 | Yalin et al. | ............ | 356/318 |

* cited by examiner

Primary Examiner—Frank G Font
Assistant Examiner—Ryan Lepisto
(74) Attorney, Agent, or Firm—Michael J. Dobbs; Daniel D. Park; Paul A. Gottlieb

(57) ABSTRACT

A laser spark distribution and ignition system that reduces the high power optical requirements for use in a laser ignition and distribution system allowing for the use of optical fibers for delivering the low peak energy pumping pulses to a laser amplifier or laser oscillator. An optical distributor distributes and delivers optical pumping energy from an optical pumping source to multiple combustion chambers incorporating laser oscillators or laser amplifiers for inducing a laser spark within a combustion chamber. The optical distributor preferably includes a single rotating mirror or lens which deflects the optical pumping energy from the axis of rotation and into a plurality of distinct optical fibers each connected to a respective laser media or amplifier coupled to an associated combustion chamber. The laser spark generators preferably produce a high peak power laser spark, from a single low power pulse. The laser spark distribution and ignition system has application in natural gas fueled reciprocating engines, turbine combustors, explosives and laser induced breakdown spectroscopy diagnostic sensors.

17 Claims, 6 Drawing Sheets

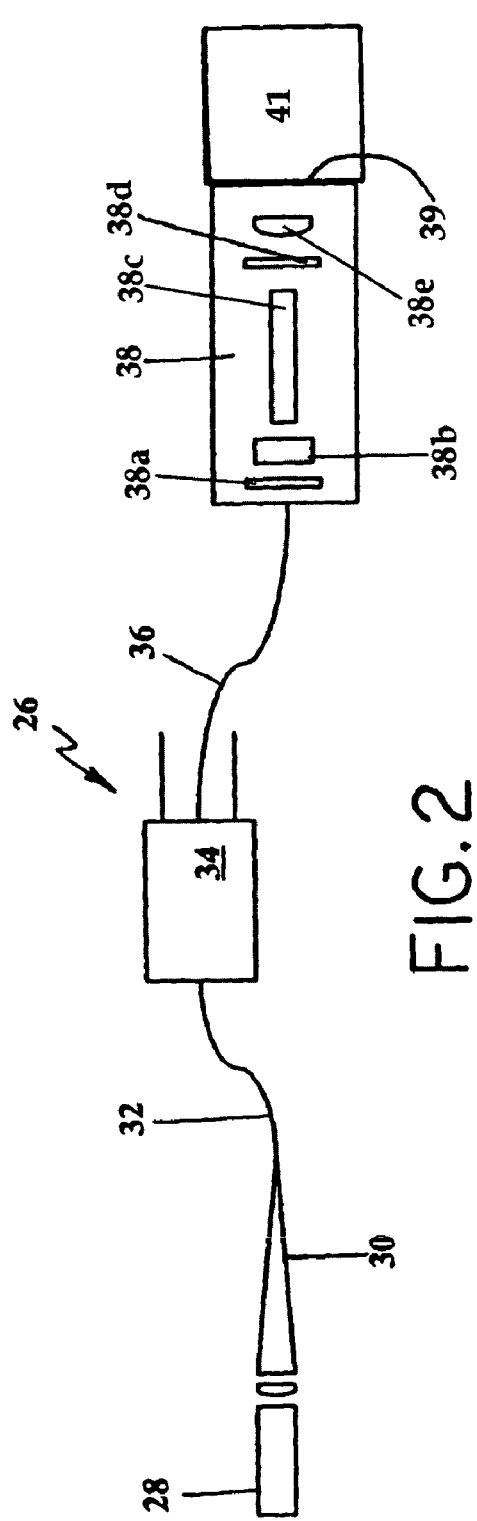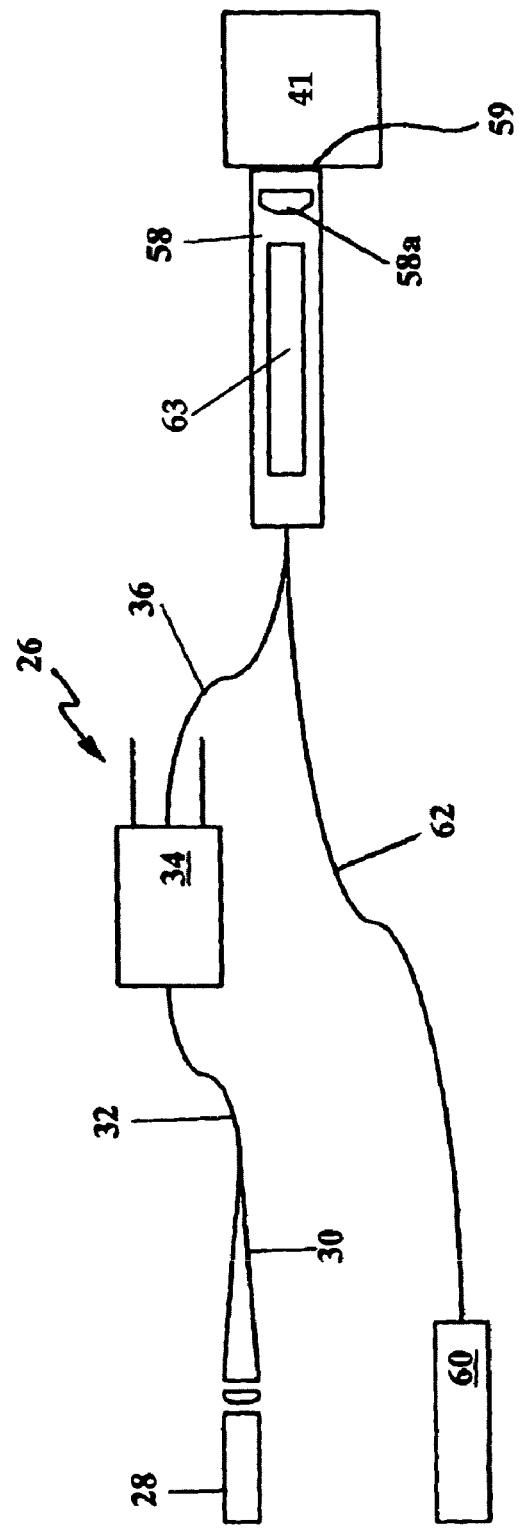

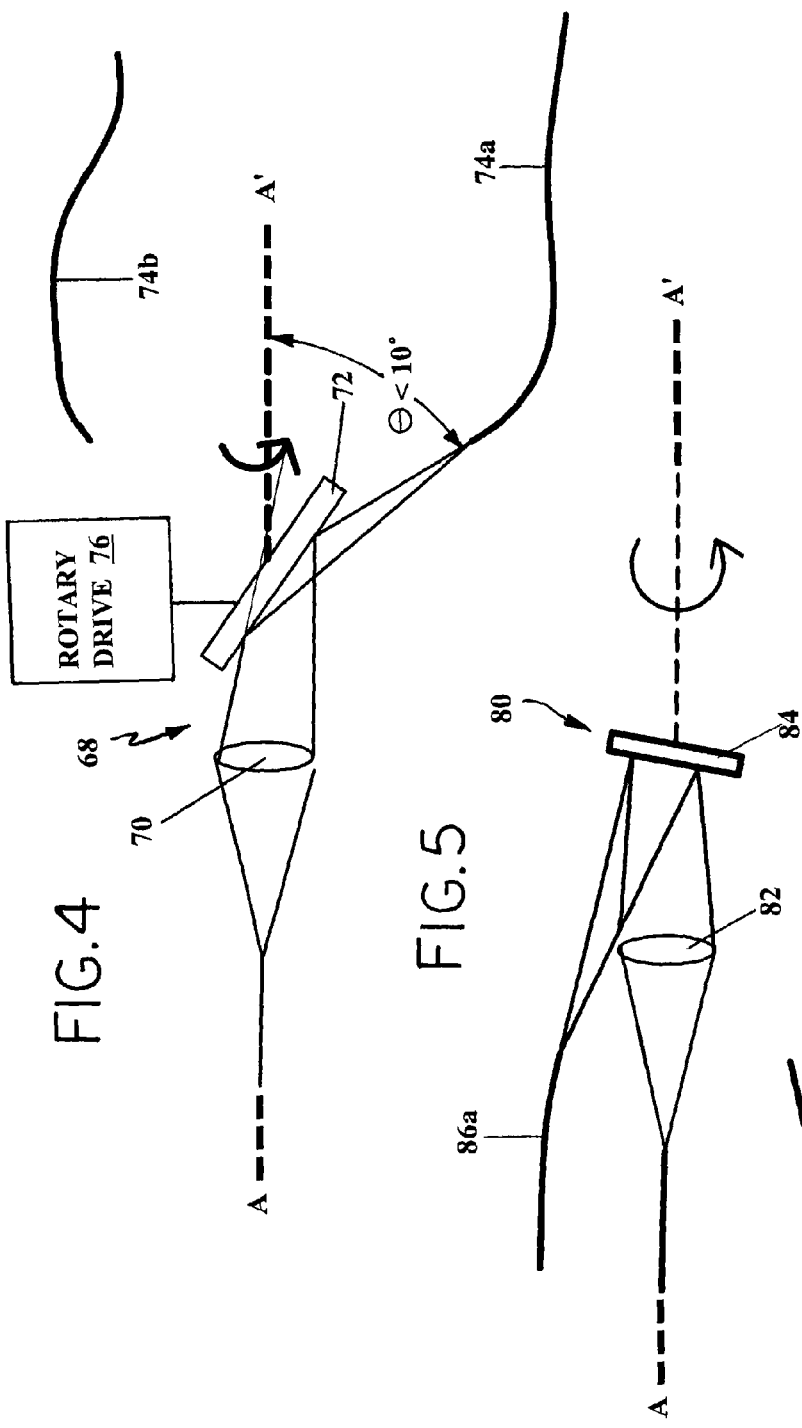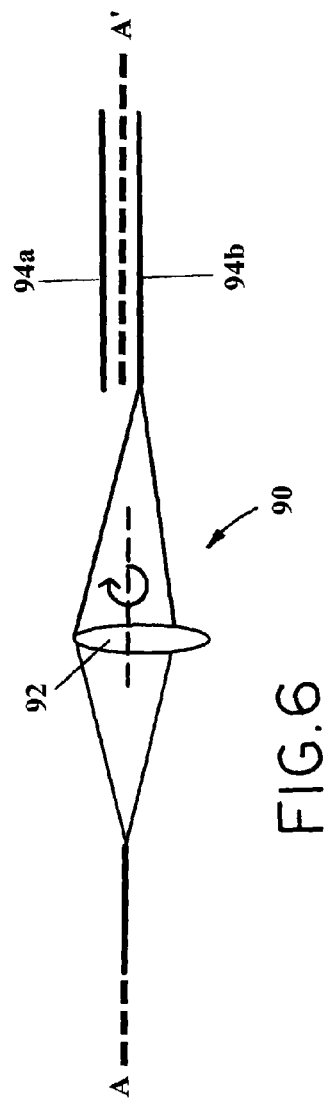

LASER SPARK DISTRIBUTION AND IGNITION SYSTEM

The United States Government has rights in this invention pursuant to the employer-employee relationship between the Government and the Inventors.

FIELD OF THE INVENTION

A laser spark system providing for the delivery and distribution of optical pumping energy having a low peak power to plural spaced locations to be amplified into a high energy spark.

BACKGROUND OF THE INVENTION

Current emission regulations relating to $NO_x$ require reciprocating engines to operate at very lean fuel/air mixtures. The excess air keeps the combusting gases cooler and limits thermal $NO_x$ development. At the same time, the lean mixture requires much more energy to be delivered to the spark plug for successful ignition. The higher energy flowing through the spark plug electrodes increases erosion to the point that the spark plugs last only hundreds of hours. The spark plugs also cost in excess of $100 each because of the rare earth metals used in the electrodes to extend their life. The resulting maintenance costs are thus very high, especially for natural gas fueled energy generation engines which must run continuously for thousands of hours.

The concept of delivering peak energy with fiber optics has received much attention in this regard. However, when energy sufficient to generate a plasma pulse is directed through an optical fiber, the fiber and spot size must be large to prevent fiber destruction. The large fiber size dictates the size of the exit aperture, with a large exit aperture making it difficult to focus the light to a sufficiently small diameter to generate a plasma spark. It is possible to deliver enough energy for a spark when focused on a condensed material, but not for the gas phase. What is desired is to transmit the light through a small diameter, single mode fiber. However, when the energy is focused to a small enough diameter to match the smaller fiber size, it usually generates a spark prior to entering the fiber, or impurities in the fiber cause the fiber to fracture with the high power, in either case rendering the optical fiber useless.

Therefore, there is a need for a low cost and efficient laser spark system, for use in various applications such as reciprocating engines, turbine combustors, explosives, destruction or overloading of electronic imaging devices, and laser induced breakdown spectroscopy diagnostic sensors.

SUMMARY OF THE INVENTION

A laser spark system for providing a spark having an optical pumping source, an optical distributor, and a plurality of distinct spark generators. The optical pumping source has a peak optical power less than 1,000 Watts. The optical distributor is optically coupled to the optical pumping source. Each spark generator from the plurality of distinct spark generators is optically coupled to the optical distributor and capable of creating a high energy spark in a sequence directed by the optical distributor.

In one embodiment, the laser spark generators are each a laser amplifier having a laser media and a seed laser. The laser media is energized by optical pumping energy from the optical pumping source. A seed pulse from the seed laser is amplified by the energized laser media to produce a high energy spark.

In another embodiment, the laser spark generators are laser oscillators comprising a high reflectivity mirror, a Q-switch, a laser media, an output coupler, and a lens. The optical pumping source is optically connected to the laser media. The laser media is made of a material that emits a lasing energy when exposed to energy from the optical pumping source. The high reflectivity mirror is reflective to the lasing energy, and positioned adjacent to and optically connected to the Q-switch or the laser media along a pumping axis. The Q-switch is adjacent to and optically connected to the laser media along the pumping axis. The laser media or the Q-switch is adjacent to and optically connected to the output coupler along the pumping axis. The output coupler is adjacent to and optically connected to the lens along the pumping axis.

BRIEF DESCRIPTION OF THE DRAWINGS

The appended claims set forth the novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 shows one embodiment of the laser spark system incorporating the preferred laser oscillator;

FIG. 3 shows one embodiment of the laser spark system incorporating a seed laser and a laser amplifier;

FIGS. 4, 5, 6 and 6a, 7 show five embodiments of an optical distributor for use in the laser spark system.

DETAILED DESCRIPTION OF THE PREFERRED EMBODIMENTS

Figure 1:
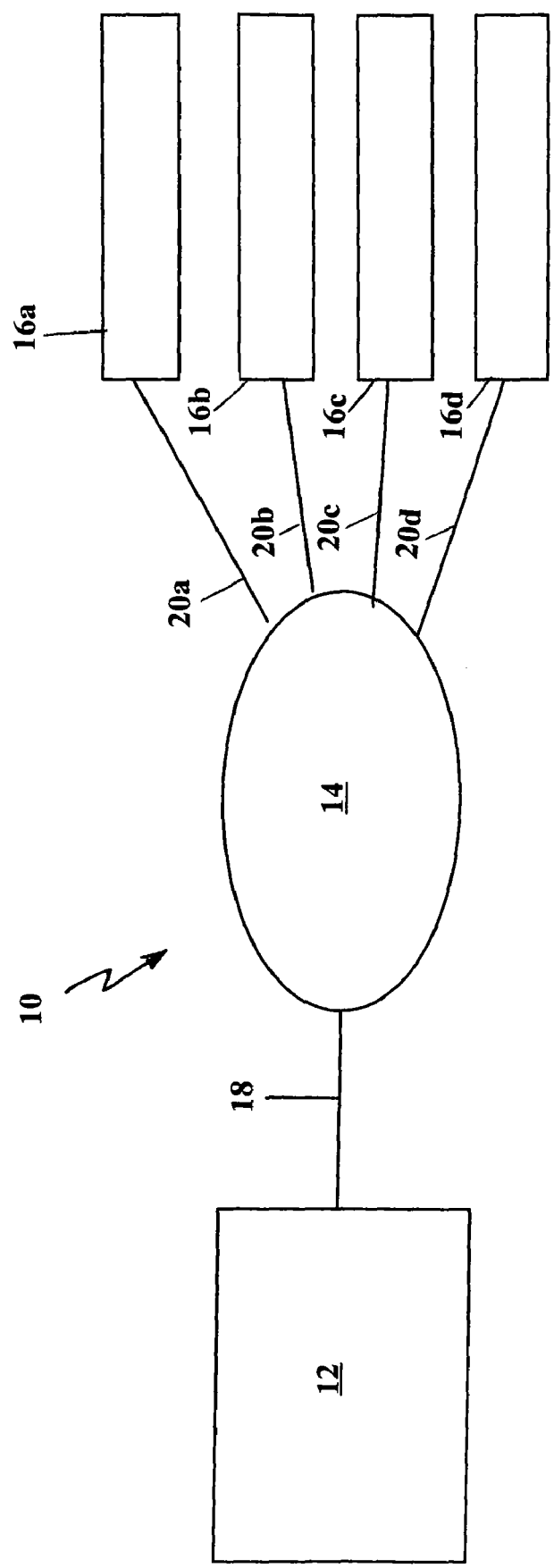
FIG. 1 generally depicts one embodiment of the laser spark system.

The laser spark system 10, shown in FIG. 1, has an optical pumping source 12, an optical distributor 14, and a plurality of distinct laser spark generators 16a-16d. The optical pumping source 12 is optically connected to the optical distributor 14 by a first optical fiber 18. The optical distributor 14 is also optically connected to a laser spark generator from the plurality of distinct laser spark generators 16a-16d by an optical fiber from a plurality of distinct laser spark generators 20a-20d, whereby the optical pumping energy can be directed to a single laser spark generator. Therefore, the plurality of distinct laser spark generators 16a-16d are optically pumped from the optical pumping source 12 via the first optical fiber 18, the optical distributor 14, and an optical fiber from the plurality of distinct laser spark generators 20a-20d. The optical fibers (first optical fiber 18 and plurality of distinct laser spark generators 20a-20d) confine the optical pumping energy and limits the potential hazard to workmen in the area. For simplicity only four spark generators 16a-16d are shown in FIG. 1, but any number of spark generators may be used.

The optical pumping source 12 produces optical pumping energy having low peak power (less than 1,000 peak Watts, typically about 500-1,000 Watts depending on the laser media). The optical pumping energy generally needs to be large enough to charge the laser spark generator. The optical pumping energy may be a single pulse, as in the preferred embodiment, a continuous stream, or a series of pulses. In the preferred embodiment, the optical pumping source 12 is a laser diode providing optical pumping energy in the form of a single pulse having a low power (less than 1,000 peak Watts).

The optical distributor 14 sequentially provides the optical pumping energy from the first optical fiber 18 to each of the optical fibers from the plurality of distinct optical fibers 20a-20d in a precisely timed sequence. Each of the optical fibers from the plurality of distinct optical fibers 20a-20d is coupled to a distinct laser spark generator from the plurality of distinct laser spark generators 16a-16d. In the preferred embodiment, each of the laser spark generators 16a-16d is adjacent to and optically connected to a combustion chamber of an internal combustion engine.

Each laser spark generator from the plurality of distinct laser spark generators 16a-16d deliver lasing energy focused into a high energy spark in a combustion chamber of an internal combustion engine. In the preferred embodiment, the laser spark generators 16a-16d are each at a combustion chamber to simplify alignment issues when focusing the laser beam into a high energy spark. The amount of power required to create a high energy spark is dependent upon the air and pressure of the air surrounding the desired spark. Each laser spark generator is preferably a laser oscillator or a laser amplifier, more preferably a laser oscillator. The laser oscillator requires only optical pumping energy from the optical pumping source 12 to create a high energy spark. The laser amplifier requires optical pumping energy from the optical pumping source 12, and seed energy (generated by a seed laser) to create a high energy spark.

FIG. 2 shows additional details of the laser spark system 26 in accordance with the preferred embodiment. In the laser spark system 26, an optical pumping source 28 provides optical pumping energy via a combination of coupling optics 30 and a first optical fiber 32 to an optical distributor 34. The optical distributor 34 is coupled via a second optical fiber 36 to a laser spark generator. The laser spark generator is more specifically a laser oscillator 38. The optical pumping energy is coincident with the absorption line of a laser media 38c of the laser oscillator 38. The laser oscillator 38, creates a spark that is directed to an adjacent and optically connected combustion chamber 41. Although only a single combination of the second optical fiber 36 and the laser oscillator 38 is shown in the figure for simplicity, any number of the combination of the second optical fiber 36 and the laser oscillator 38 may be used to create sparks in a single combustion chamber, multiple combustion chambers, multiple distinct combustion chambers, or combinations thereof.

The optical pumping source 28 with coupling optics 30 preferably delivers optical pumping energy to the optical distributor 34 as a point source of one millimeter or less and divergence of 45 degrees or less, typical of an optical fiber. The optical pumping source 28 is preferably in the form of an array of diode lasers in a linear or square matrix. The array is a set of laser point sources. A set of optical components in the form of coupling optics 30 collect the light from the array of diode lasers and collectively focus the light into the first optical fiber 32. These diode lasers preferably collectively produce up to several thousand Watts of optical pumping energy. The energy is in a narrow wavelength range tuned to the absorption band of a laser media 38c, e.g., 808 nm for the preferred Nd:YAG (neodymium-doped yttrium aluminium garnet) laser media 38c. This energy, when optically switched, is easily transmitted through the first optical fiber 32, the optical distributor 34, and the second optical fiber 36 because it is less than 1,000 peak Watts and cannot form a high energy spark. Preferably, the peak power and the average power of the optical pumping energy is about 500-1,000 Watts depending upon the laser media 38c. However, a pulse of this optical pumping energy of less than 1 milliseconds is sufficient to energize the laser media 38c.

The optical pumping source 28 may consist of one or more laser diode bars with a row of emitting elements typically 100 microns long situated on 200 micron centers. The geometry of the individual emitting elements causes the light to be highly divergent in one direction. Therefore, coupling optics 30 may be required to focus the divergent beams into a beam capable of being handled and directed into the first optical fiber 32.

The optical distributor 34 collects the optical pumping energy coming from the first optical fiber 32, and relays it to the second optical fiber 36 in sequence to optically pump an individual laser oscillator 38 to ignite fuel/air mixtures in the combustion chamber 41 of an engine with microsecond accuracy. The optical distributor 34 has a timing precision of less than 10 microseconds and maintains the optical pumping energy focused on the second optical fiber 36 for a dwell time less than a millisecond. The optical distributor 34 may take the form of a rotating element which may be either a lens, a prism, or a mirror for deflecting light at a select angle from its axis of rotation. The rotation may be continuous or stepwise. When the optical distributor 34 rotates continuously, the angle of deflection will be small such that the radial velocity of the focused energy permits a less than 1 millisecond dwell time on the second optical fiber 36 delivering optical pumping energy to the laser oscillator 38. When the rotation is stepwise, the optical distributor 34 may be either a mirror or a lens, but there is no restriction on the angle of deflection, since dwell time is determined by the stepping mechanism. A shallow angle deflection is desired since it requires much less precision in the controlling motor, making for a more economical apparatus.

One embodiment of an optical distributor 68, shown in FIG. 4, comprises of a rotating mirror 72 reflecting the light at a shallow oblique angle (<10 degrees) relative to the mirror's axis of rotation A-A'. The incident light is focused by means of a lens 70 onto the ends of a plurality of distinct optical fibers arranged in a circular array. For simplicity, only two optical fibers 74a and 74b in the plane of the drawing sheet are shown. In addition, FIG. 4 shows, in simplified block diagram form, a rotary drive 76 coupled to the rotating mirror 72.

Another embodiment of an optical distributor 80, shown in FIG. 5, comprises of a mirror 84 oriented at a greater angle relative to the mirror's axis of rotation A-A' to reflect the light at a steeply obtuse angle (>170 and <180 degrees), with the angles of incidence and reflectance <10 degrees. A rotary drive is also coupled to the reflector 84 although not shown for simplicity. A lens 82 focuses the incident optical pumping energy on the ends of a plurality of distinct optical fibers arranged in a circular array, where only two optical fibers 86a and 86b are shown for simplicity.

Another embodiment of an optical distributor 90, shown in FIG. 6, is in the form of a rotating lens 92 which has its optical axis offset from its axis of rotation such that the focal point traces a circle about a rotation axis A-A', with a plurality of distinct optical fibers 94a, 94b, etc. disposed in the circle.

Figure 6A:
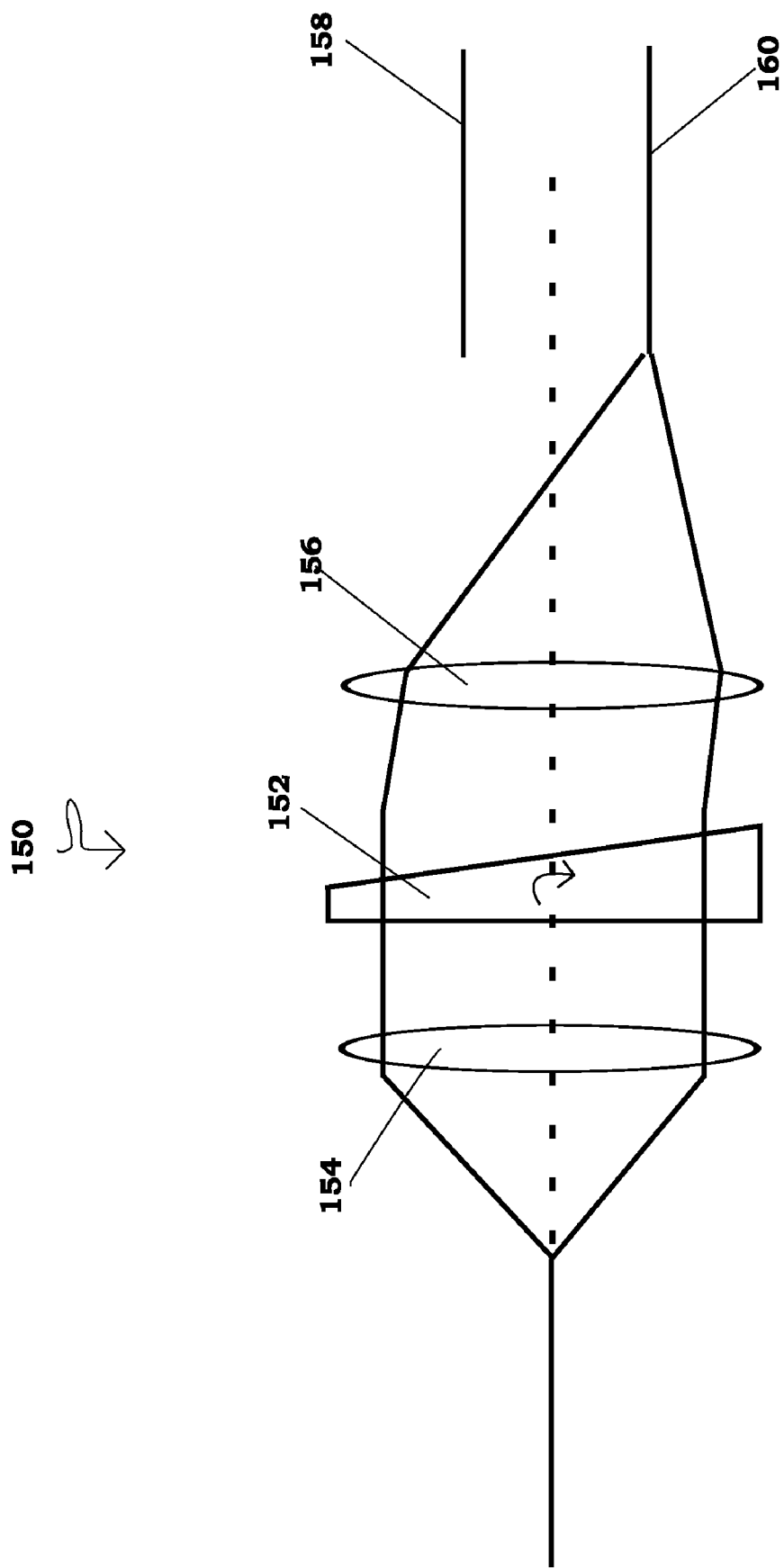

The preferred embodiment of an optical distributor 150, shown in FIG. 6a, is a rotating wedge prism 152 between two fixed lenses 154 and 156 where the prism 152 changes the direction of propagation of the light such that the focal point traces a circle about a rotation axis with a plurality of distinct optical fibers 158 and 160 disposed on the circle. The wedge prism 152 has a flat face and an angled face. The angled face of the wedge prism 152 is angled up to 45 degrees off-parallel from the flat face. The flat face and angled face may have an anti-reflection coating for pumping energy, as in the preferred embodiment. The rotating wedge prism 152 can be rotated in a continuous or stepwise fashion. In either mode of rotation, an indexing mechanism can be used to easily determine the location of the prism 152 at all times. The use of an indexing mechanism allow the prism 152 to be synchronized with the operation of a crank shaft of an internal combustion engine. The indexing mechanism is preferably a high resolution optical encoder. The radial spacing and radial dimension of the plurality of distinct optical fibers 158 and 160 will be adjusted with respect to the angle of the angled face and the number of combustion chambers.

Referring to FIG. 2, the optical fibers (first optical fiber 32 and second optical fibers 36) are of suitable optical quality to transmit the optical pumping energy with low loss. The core diameter is small enough to render a point source of light suitable for focusing optics. The optical fibers are also preferably flexible enough for the optical fibers to be rugged enough to survive in over 10,000 hours of engine operation. Optical fibers with a core diameter less than 1 millimeter is considered suitable, as the diameter is small enough to be flexible and large enough for the optical fibers to simplify the dwell issue in the optical distributor.

The laser oscillator 38, a spark generator, comprises a high reflectivity mirror 38a, a Q-switch 38b, a laser media 38c, an output coupler 38d, and a lens 38e. The high reflectivity mirror 38a is positioned adjacent to and optically connected to the Q-switch 38b along a pumping axis. The Q-switch 38b is adjacent to and optically connected to the laser media 38c along the pumping axis. The laser media 38c is adjacent to and optically connected to the output coupler 38d along the pumping axis. The output coupler 38d is adjacent to and optically connected to the lens 38e along the pumping axis.

The optical pumping energy emitted from the second optical fiber 36 passes through the high reflectivity mirror 38a, passes through the Q-switch 38, and excites the laser media 38c. The stored excited states of the laser media 38c spontaneously decay producing lasing energy in random directions. The lasing energy emitted towards the output coupler 38d will be partially reflected back to the laser media 38c. Preferably, the output coupler 38d will reflect less than 50% of the lasing energy towards the laser media 38c. Lasing energy emitted from the laser media 38c towards the Q-switch 38b is partially absorbed by the Q-switch 38b. Lasing energy that is not absorbed by the Q-switch 38b is reflected back towards the Q-switch 38b by the high reflectivity mirror 38a.

The lasing energy will reflect back and forth between the high reflectivity mirror 38a, and the output coupler 38d. The lasing energy will traverse the laser media 38c and interact with excited Nd atoms within the laser media 38c, inducing stimulated emission where the original photons from the lasing energy cause the decay of an excited state. The stimulated event produces light of the same wavelength (about 1064 nm for a Nd:YAG laser media 38c), phase, and in the same direction as the stimulating photon. At the same time the Q-switch 38b allows a certain percentage of the incident photons to pass through unimpeded. The balance of the certain percentage of photons are absorbed within the Q-switch 38b inducing excited states. When the material of the Q-switch 38b is in an excited state it is virtually transparent to the lasing energy. Therefore as more of the lasing energy is absorbed effectively make the Q-switch 38b more and more transparent for a short time. This allows more lasing energy to pass through and return producing more stimulated lasing energy within the laser media 38c.

This process of bleaching the Q-switch 38b allows a large number of excited states to build up within the laser media 38c until the Q-switch 38b reaches a threshold transparency. The Q-switch 38b begins to bleach exponentially and the number of photons within the laser cavity also grows exponentially. At this point, the Q-switch 38c is virtually clear of losses and the large scale lasing depletes the excited states in the laser media 38c within a few round trips. The output lasing energy produced is high energy and has very short pulse width. This output lasing energy is directed through the lens 38e and into a combustion chamber 41. The lens 38e focuses the lasing energy into a high energy spark of a sufficiently small spot size so as to create a spark, about the power density or photon flux density of about $1 \times 10^{11}$ W/cm$^2$. This level of power density inside the combustion chamber 41 under compression is more than enough to initiate a laser spark and ignition of the fuel and ambient air mixture under over 1 Atm. Different pressures, and air will require a different power density. For instance, if air having an AQI (Air Quality Index) of 49 is used about $1 \times 10^{13}$ W/cm$^2$ of power density or photon flux density will be required.

The high reflectivity mirror 38a allows pumping energy emitted from the second optical fiber 36, to pass through, while reflecting the lasing energy. Preferably, the high reflectivity mirror 38a is fused silica, or sapphire having a reflective coating that is reflective to the lasing energy, and an anti-reflective coating that is transparent to the pumping energy. More preferably, the high reflectivity mirror 38a is fused silica having a reflective coating that is reflective to the lasing energy, and an anti-reflective coating that is transparent to the pumping energy.

The Q-switch 38b is preferably Cr:YAG (chromium-doped yttrium aluminium garnet), having enough Cr such that the small signal transmission of the lasing energy is in the range of 30-70%.

The laser media 38c can be a plurality of materials as discussed in Koechner, W., Bass, M., "Solid-State Lasers: A Graduate Text" Springer, N.Y., 2003 hereby fully incorporated by reference. The laser media 38c is generally a host material that is doped. The host materials can be materials such as Glasses, Oxides, Garnets, Vanadates, Fluorides. The Glasses are typically doped with Nd, Er, or Yb. The Oxides such as sapphire is typically doped with Ti. The Garnets are Yttrium Aluminum Garnet $Y_3Al_5O_{12}$ (YAG), Gadolinium Gallium Garnet $Gd_3Ga_5O_{12}$ (GGG), and Gadolinium Scandium Aluminum Garnet $Gd_3Sc_2Al_3O_{12}$ (GSGG) and are typically doped with rare earths such as Nd, Tm, Er, Ho, Yb. The Vanadates or Yttrium Orthovanadate (YVO$_4$) is typically doped with Nd. The Fluorides or Yttrium Fluoride (YLiF$_4$) and is typically doped with Nd. The laser media 38c is preferably Nd:YAG (neodymium-doped yttrium aluminium garnet), Nd:Glass (neodymium-doped glass), Nd:YLF(neodymium-doped yttrium lithium fluoride), Nd:YVO$_4$ (Yttrium Vanadate), Er:Glass (Erbium doped glass), Yb:YAG (ytterbium-doped yttrium aluminium garnet), Alexandrite, Ti:Sapphire (Titanium-sapphire). In the preferred embodiment laser media 38c is Nd:YAG having about 0.5% atomic weight of Nd, which will emit lasing energy at about 1064 nm. The dopant level of the laser media 38c is intentionally low to improve the performance of the laser oscillator 38. Lowering the dopant concentration effects the overall output by modifying the beam overlap, the absorption depth of the optical pumping energy, reducing thermal lensing losses, and reducing losses due to ASE (Amplified Spontaneous Emission). This leads to a much more uniform pumped gain profile as well as more uniformly distributed thermal stresses which lessens the effects of thermal lensing. The reduction of dopant concentration lowers the gain of the material slightly but offers larger energy storage capacity in return.

The output coupler 38*d* partially reflects the lasing energy, preferably less than 50% of the lasing energy is reflected. In the current, preferred embodiment, the output coupler 38*d* reflects about 20-50% of the lasing energy.

The lens 38*e* focuses the lasing energy into the high energy spark. In the preferred embodiment, the lens is a convex lens having a focal point of about one centimeter inside the combustion chamber 41.

In the preferred embodiment, a window 39 is placed between the lens 38*e* and the combustion chamber 41. The window seals the laser oscillator 38 and is scaled to resist the temperature and pressure from the combustion chamber 41. Fused silica and sapphire are a suitable materials for the window, preferably fused silica due to its lower cost.

The optical pumping source 28, coupling optics 30, first optical fiber 32, and second optical fiber 36 may have anti-reflection coatings to commensurate with the optical distributor 34. The anti-reflection coatings reduce the optical losses through lasing energy) coating on the lens 38*e*. The window 39 and the lens 38*e* may also be combined by making a suitable window material convex so as to focus the lasing energy into a high energy spark. Likewise, the lens 38*e*, output coupler 38*d*, and window 39 may all be combined into a partially reflective focusing window by making a suitable window material convex so as to focus the lasing energy into a high energy spark, and adding a partially reflective coating on the window.

In an alternative embodiment, the positions of the laser media 38*c* and the Q-switch 38*b* are switched. The high reflectivity mirror 38*a* is positioned adjacent to and optically connected to the laser media 38*c* along a pumping axis. The laser media 38*c* is adjacent to and optically connected to the Q-switch 38*b* along the pumping axis. The Q-switch 38*b* is adjacent to and optically connected to the output coupler 38*d* along the pumping axis. The output coupler 38*d* is adjacent to and optically connected to the lens 38*e* along the pumping axis.

The optical pumping source 28 may be positioned at the laser oscillator 38 to eliminate the first optical fiber 32, the optical distributor 34, and the second optical fiber 36. However, placing the optical pumping source 28 at the laser oscillator 38 may not be desirable since the optical pumping source 28 is the most expensive component and replicating it through the optical distributor 34 to several laser oscillators is more cost effective. It is also easier to cool the optical pumping source 28 when it is not directly connected to the heat generating combustion chamber 41.

Figure 8:
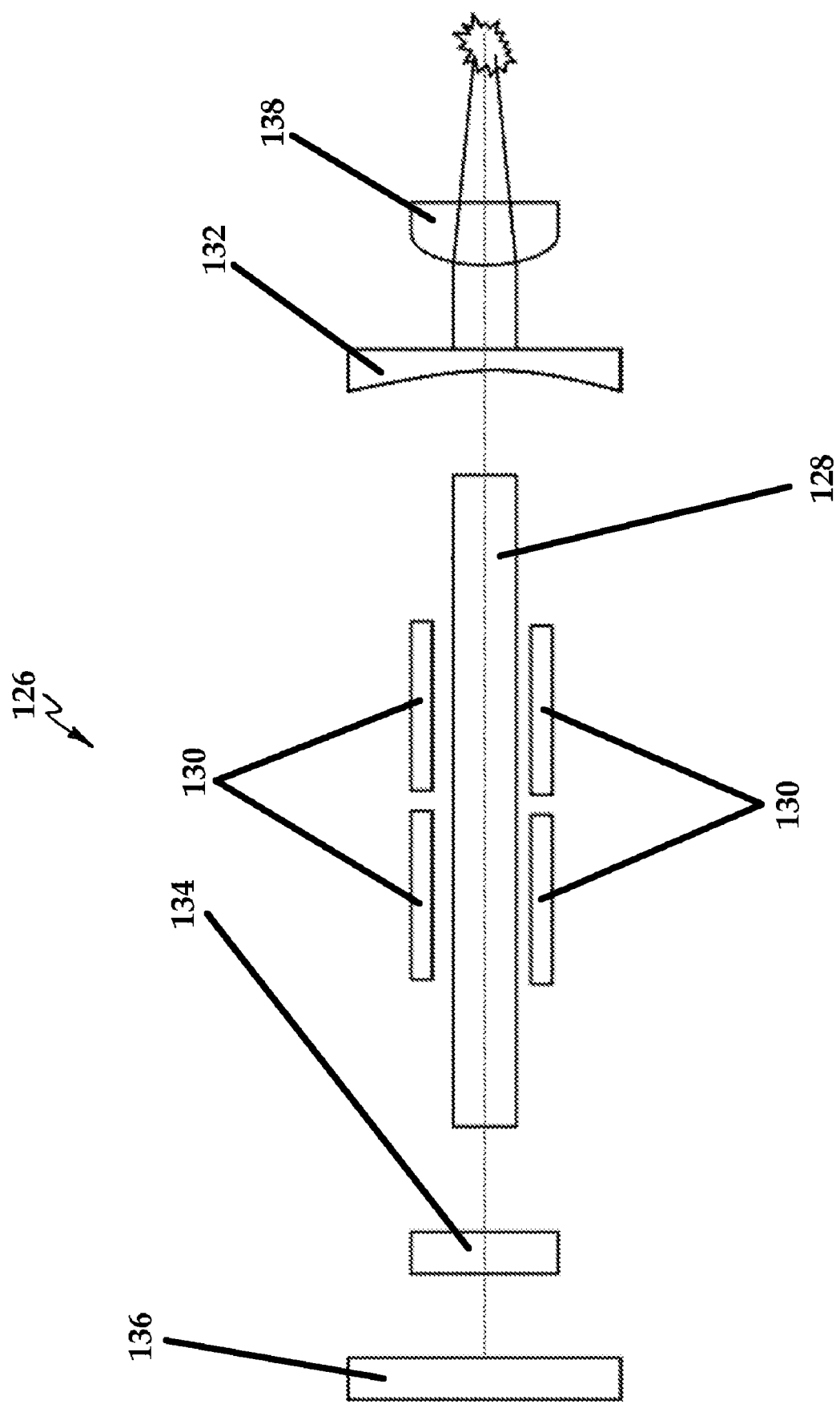
FIG. 8 shows an embodiment of the laser spark system incorporating a side pumped laser oscillator.

One embodiment of a side pumped laser oscillator 126, shown in FIG. 8, comprises a laser media 128, one or more optical pumping sources 130, an output coupler 132, a Q-switch 134, a high reflectivity mirror 136, and a lens 138. The high reflectivity mirror 136, Q-switch 134, laser media 128, output coupler 132, and lens 138 are the same as the respective component as described in the laser oscillator 38 shown in FIG. 2. The operation of the side pumped laser oscillator 126 is the same as with the laser oscillator 38 shown in FIG. 2, except the laser media 128 is pumped directly by the optical pumping sources 130. The optical pumping sources 130 are each the same as the optical pumping source 28 shown in FIG. 2, preferably diode lasers that emit an optical pumping energy at about 808 nm producing less than 1,000 peak Watts of power combined. Preferably, the optical pumping sources 130 are positioned along the length of the laser media 128.

In order to prevent multiple output pulses of the side pumped laser oscillator 126, either the output coupler 132 or the high reflectivity mirror 136 must be convex, creating a focal region, preferably within the Q-switch 134. In one embodiment, the output coupler 132 is convex and the high reflectivity mirror 136 is flat. In an alternative embodiment the output coupler 132 is flat and the high reflectivity mirror 136 is convex.

In another embodiment, shown in FIG. 3, the spark generator is a laser amplifier 58 comprising of a laser media 63, a lens 58*a*, a seed laser 60 and a third optical fiber 62. In this embodiment, the second optical fiber 36 pumps the laser media 63 to an excited state without feedback mirrors. The third optical fiber 62 delivers a seed energy at the lasing energy wavelength to the laser media 63 to be amplified by the excited laser media 63. The seed energy is preferably less than about 1 mega-joule having a duration of about 5-10 ns, or about 200 KW. The resultant lasing energy focused by the focusing lens 58*a* into a high energy spark. Preferably the high energy spark is focused through a pressure barrier window 59 into a combustion chamber 41 to form a spark approximately 1 centimeter inside the combustion chamber 41.

The seed laser 60 provides a seed energy at the lasing energy wavelength via the third optical fiber 62 to the laser amplifier 58. The seed laser 60 is preferably a high beam quality, Q-switched Nd:YAG (neodymium-doped yttrium aluminum garnet) laser. The third optical fiber 62 is a small diameter optical fiber capable of delivering the seed pulse to the laser media 63. The optical pumping source 28, first optical fiber 32, optical distributor 34, second optical fiber 36, and combustion chamber 41 are the same as with the laser spark system 26 shown in FIG. 2. The laser media 63, lens 58*a*, and window 59, are also the same as the respective laser media 38*c*, lens 38*e*, and window 39 as with the laser spark system 26 shown in FIG. 2. Anti-reflective coatings may be applied to the various components of the laser spark system for pumping energy, anti-reflective coatings may also be add for the seed energy. Anti-reflective coatings for pumping energy and seed energy will reduce optical losses and improve system efficiency.

Although not shown in FIG. 3, a lens may be placed at the output of the third optical fiber 62 to collimate the seed energy from the seed laser 60 and direct it to the laser media 63.

Alternatively, the seed laser 60 may be directly attached to the laser amplifier 58 for direct distribution of seed energy, distributed through the optical distributor 34, distributed through a separate seed energy optical distributor, or distributed co-linearly through the second optical fiber 36. The seed energy can be delivered to each laser amplifier 58 for every single ignition event, whereby its energy is divided equally and is synchronized with the timing signals available from a crank shaft and/or cam shaft encoder of an internal combustion engine.

The seed energy may be distributed through the optical distributor 34, whereby only a single seed laser 60 is required for any number of laser amplifiers. In this embodiment, the seed energy is distributed with the optical pumping energy when properly timed and aligned for differences in refraction due to wavelength differences between the optical pumping energy and seed energy. The seed energy may also be distributed through a separate seed energy optical distributor separate and distinct from the optical distributor 34.

Figure 7:
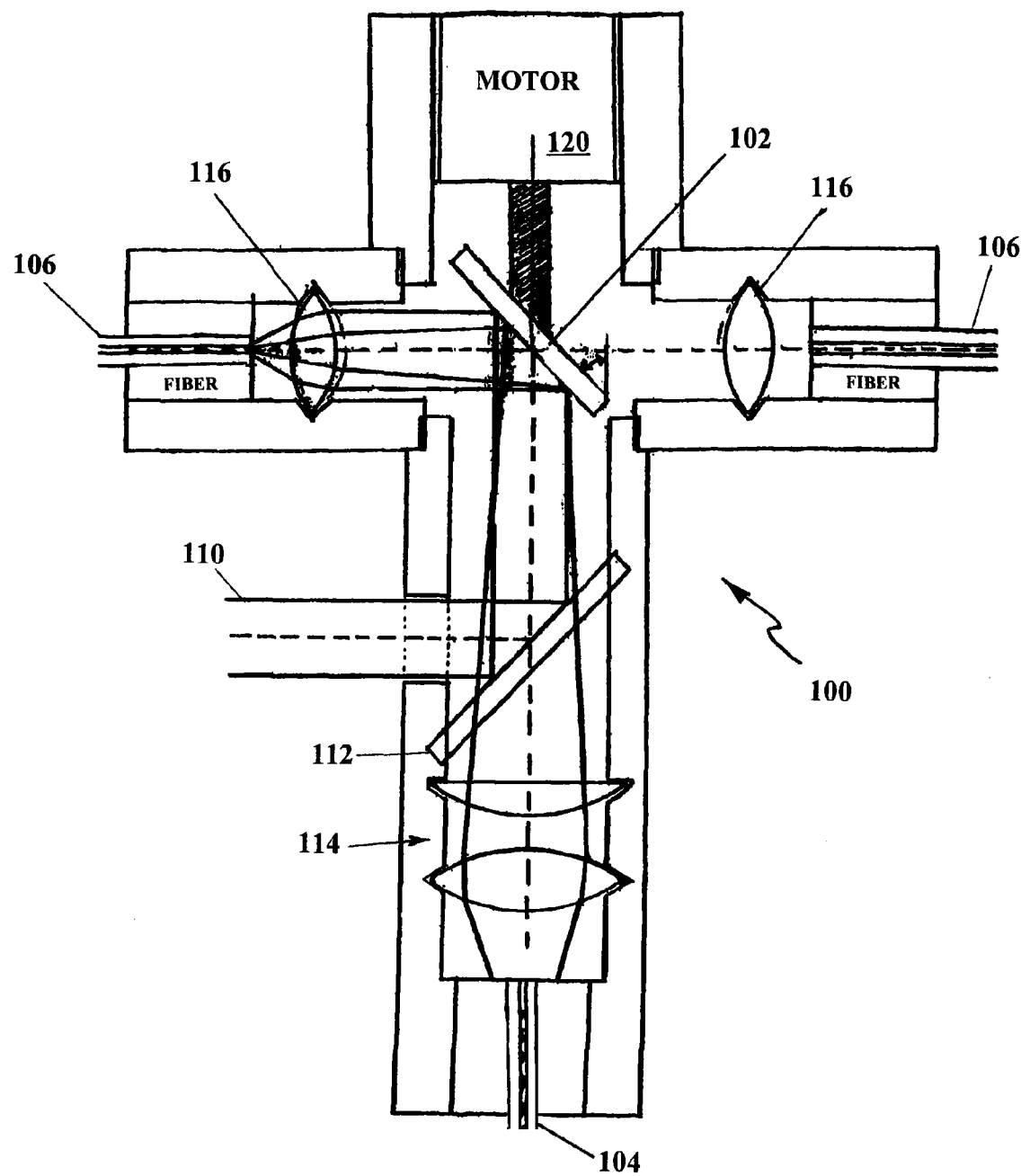

One embodiment of an optical distributor 100 distributing seed energy is shown in FIG. 7. A rotating mirror 102 has an angle of reflection of about 90°. A first optical fiber 104 directs optical pumping energy through collimating optics 114, followed by a partial mirror 112 and onto the rotating mirror 102. A third optical fiber 110 directs seed energy towards the partial mirror 112, which reflects the seed energy towards the rotating mirror 112. The rotating mirror 102 is coupled to and rotated by a drive motor 120 in a stepwise or continuous manner. The optical pumping energy and the seed energy is directed by the rotating mirror 102 to an optical fiber coupling lens from a plurality of distinct optical fiber coupling lenses 116 and into an optical fiber from a plurality of distinct second optical fibers 106. For simplicity, only two fibers from the plurality of distinct second optical fibers 106 are shown in FIG. 7, however additional optical fibers arranged in a generally circular array are also disposed in the plane of the plurality of distinct second optical fibers 106 shown in FIG. 7.

Referring to FIG. 3, seed energy may also be inserted into the second optical fiber 36 collinearly with the optical pumping energy using a beam splitter or polarizing device upstream from the laser optics. This co-linear delivery arrangement allows for a stronger seed energy pulse for each ignition event.

The laser amplifier 58 can also be fitted with a single seed laser optical fiber equally divided from one seed laser to all combustion chambers. The pump fiber can then be arranged for side or end pumping or in a multitude of fibers in a circular fashion around the seed fiber. The seed fiber in this case may use a GRIN(graded-index) lens, but any other collimating lens may be used as well. The lens collimates the seed beam for the end seeding application. The distribution system described herein is a means to deliver the pump energy to a specified amplifier at a specified time.

The optical pumping source 28, the seed laser 60, or both the optical pumping source 28 and the seed laser 60 may be positioned at the laser amplifier 58 to eliminate the first optical fiber 32, optical distributor 34, second optical fiber 36, third optical fiber 62, or combinations thereof. However, placing the optical pumping source 28 at the laser amplifier 58 may not be desirable since the optical pumping source 28 is the most expensive component and replicating it through the optical distributor 34 to several laser amplifiers is more cost effective. It is also easier to cool the optical pumping source 28, and the seed laser 60 when they are not directly connected to the heat generating combustion chamber 41.

Although the preferred use of the laser spark system is for initiating combustion in a combustion chamber, other uses may be possible. For example any of the above embodiments can be used to ignite an explosive, by a single or successive laser sparks. Likewise, any of the above embodiments can be used for the destruction or overloading of electronic imaging devices, by a single or successive laser sparks. In the case of the destruction or overloading of a typical CCD camera, a spark capable of initiating combustion is used to create a high intensity light that, when exposed, will overload or destroy a CCD typically found in digital imaging equipment (e.g. digital cameras).

While particular embodiments of the laser spark system have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

We claim:

1. A laser spark system for providing a spark comprising:
an optical pumping source, an optical distributor, and a plurality of distinct spark generators;
said optical pumping source having a peak optical power less than 1,000 Watts;
said optical distributor optically coupled to said optical pumping source;
each spark generator from said plurality of distinct spark generators optically coupled to said optical distributor and capable of creating a high energy spark in a sequence directed by said optical distributor;
each of said plurality of distinct spark generators are comprised of: a high reflectivity mirror, a Q-switch, and a laser media;
said optical pumping source optically connected to said laser media and creating a pumping energy;
said laser media made of a material that emits a lasing energy when exposed to said pumping energy;
said high reflectivity mirror reflective to said lasing energy, and positioned adjacent to and optically connected to said Q-switch or said laser media along a pumping axis;
said Q-switch adjacent to and optically connected to said laser media along said pumping axis;
an output coupler and lens selected from the group consisting of both a lens and an output coupler or a single output coupler lens; and
said laser media or said Q-switch adjacent to and optically connected to said output coupler and lens along said pumping axis.

2. The laser spark system of claim 1 whereby:
said optical pumping source is optically coupled to said optical distributor by a first optical fiber; and
said optical distributor is distinctly optically coupled to said plurality of distinct spark generators by a plurality of distinct second optical fibers.

3. The laser spark system of claim 2 whereby said first optical fiber, and said plurality of distinct second optical fibers are each 1 millimeter or less in diameter.

4. The laser spark system of claim 1 whereby said optical pumping source is comprised of:
a laser diode array;
a focusing lens wherein said laser diode array is optically connected to said focusing lens.

5. The laser spark system of claim 1 whereby said optical pumping source generates a single pulsed beam which has a dwell time less than 1 millisecond between said optical distributor and a single spark generator from said plurality of distinct spark generators.

6. The laser spark system of claim 1 whereby said optical pumping source has a means for generating light at about 808 nm.

7. The laser spark system of claim 1 whereby a spark generator of said plurality of distinct spark generators is comprised of a laser media from the group consisting of Nd:YAG, Nd:Glass, Nd:YLF, Nd:YVO$_4$, Er:Glass, Yb:YAG, Alexandrite, Ti:Sapphire.

8. The laser spark system of claim 1 whereby a spark generator of said plurality of distinct spark generators is comprised of a laser media made of Nd:YAG having about 0.35-0.75% atomic weight of Nd.

9. The laser spark system of claim 1 further comprising a window disposed between each said plurality of distinct spark generators and a combustion chamber.

10. The laser spark system of claim 9 whereby said window is fused silica or sapphire.

11. The laser spark system of claim 1 whereby a distinct spark generator from said plurality of distinct spark generators is capable of focusing said optical energy with an intensity greater than $10^{10}$ W/cm$^2$ over less than 10 nanoseconds.

12. The laser spark system of claim 1 whereby said output coupler and lens comprises a single output coupler lens.

13. The laser spark system of claim 1 whereby said output coupler and lens comprises both an output coupler and a lens.

14. The laser spark system of claim 1 whereby:
   a. said high reflectivity mirror is positioned adjacent to and optically connected to said Q-switch along said pumping axis; and
   b. said laser media adjacent to and optically connected to said output coupler and lens along said pumping axis.

15. The laser spark system of claim 1 whereby:
   a. said high reflectivity mirror is positioned adjacent to and optically connected to said laser media along said pumping axis; and
   b. said Q-switch adjacent to and optically connected to said output coupler and lens along said pumping axis.

16. A laser spark system for providing a spark comprising:
   an optical pumping source, an optical distributor, and a plurality of distinct spark generators;
   said optical pumping source having a peak optical power less than 1,000 Watts;
   said optical distributor optically coupled to said optical pumping source;
   each spark generator from said plurality of distinct spark generators optically coupled to said optical distributor and capable of creating a high energy spark in a sequence directed by said optical distributor;
   each of said plurality of distinct spark generators are comprised of: a high reflectivity mirror, a Q-switch, a laser media, an output coupler, and a lens;
   said optical pumping source optically connected to said laser media and creating a pumping energy;
   said laser media made of a material that emits a lasing energy when exposed to said pumping energy;
   said high reflectivity mirror reflective to said lasing energy, and positioned adjacent to and optically connected to said Q-switch or said laser media along a pumping axis;
   said Q-switch adjacent to and optically connected to said laser media along said pumping axis;
   said laser media or said Q-switch adjacent to and optically connected to said output coupler along said pumping axis; and
   said output coupler adjacent to and optically connected to said lens along said pumping axis.

17. A laser spark system for providing a spark comprising:
   an optical Dumping source, an optical distributor, and a plurality of distinct spark generators;
   said optical pumping source having a Peak optical power less than 1,000 Watts;
   said optical distributor optically coupled to said optical pumping source;
   each spark generator from said plurality of distinct spark generators optically coupled to said optical distributor and capable of creating a high energy spark in a sequence directed by said optical distributor;
   whereby each of said plurality of distinct spark generators are comprised of: a high reflectivity mirror, a Q-switch, a laser media, and an output coupler lens;
   said optical pumping source optically connected to said laser media and creating a pumping energy;
   said laser media made of a material that emits a lasing energy when exposed to said pumping energy;
   said high reflectivity mirror reflective to said lasing energy, and positioned adjacent to and optically connected to said Q-switch or said laser media along a pumping axis;
   said Q-switch adjacent to and optically connected to said laser media along said pumping axis; and
   said laser media or said Q-switch adjacent to and optically connected to said output coupler lens along said pumping axis.

* * * * *